(12) United States Patent  
Brech et al.

(10) Patent No.: US 9,235,441 B2  
(45) Date of Patent: *Jan. 12, 2016

(54) OPTIMIZING ENERGY USE IN A DATA CENTER BY WORKLOAD SCHEDULING AND MANAGEMENT

(71) Applicant: International Business Machines Corporation, Armonk, NY (US)

(72) Inventors: Brad L. Brech, Rochester, MN (US); Murthy V. Devarakonda, Peekskill, NY (US); Bret W. Lehman, Raleigh, NC (US); Stacey Ramos, Cedar Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,202

(22) Filed: Dec. 10, 2012

(65) Prior Publication Data

US 2013/0104136 A1    Apr. 25, 2013

Related U.S. Application Data

(63) Continuation of application No. 12/987,413, filed on Jan. 10, 2011.

(51) Int. Cl.
*G06F 9/46* (2006.01)
*G06F 9/48* (2006.01)

(52) U.S. Cl.
CPC .............. *G06F 9/4893* (2013.01); *Y02B 60/144* (2013.01)

(58) Field of Classification Search
CPC ...... G06F 9/4881; G06F 9/4893; G06F 1/329; G06F 1/3293; G06F 1/3296; G06F 1/3287; Y02B 60/1278; Y02B 60/144
See application file for complete search history.

(56) References Cited

U.S. PATENT DOCUMENTS

| | | | |
|---|---|---|---|
| 7,165,252 B1 * | 1/2007 | Xu | 718/102 |
| 2007/0002750 A1 * | 1/2007 | Sang | H04W 72/1236 370/238 |
| 2008/0222025 A1 * | 9/2008 | Fellenstein et al. | 705/37 |
| 2009/0265568 A1 * | 10/2009 | Jackson | 713/320 |
| 2011/0055843 A1 * | 3/2011 | Keeton et al. | 718/104 |
| 2011/0173626 A1 | 7/2011 | Chi et al. | |
| 2012/0054771 A1 | 3/2012 | Krishnamurthy et al. | |
| 2012/0066020 A1 * | 3/2012 | Moon et al. | 705/7.28 |
| 2012/0110582 A1 * | 5/2012 | Ferdous et al. | 718/101 |
| 2012/0137002 A1 * | 5/2012 | Ferris et al. | 709/226 |
| 2012/0180055 A1 | 7/2012 | Brech et al. | |

* cited by examiner

*Primary Examiner* — Jason Mitchell  
*Assistant Examiner* — Kevin X Lu  
(74) *Attorney, Agent, or Firm* — Patterson & Sheridan, LLP

(57) ABSTRACT

Techniques are described for scheduling received tasks in a data center in a manner that accounts for operating costs of the data center. Embodiments of the invention generally include comparing cost-saving methods of scheduling a task to the operating parameters of completing a task—e.g., a maximum amount of time allotted to complete a task. If the task can be scheduled to reduce operating costs (e.g., rescheduled to a time when power is cheaper) and still be performed within the operating parameters, then that cost-saving method is used to create a workload plan to implement the task. In another embodiment, several cost-saving methods are compared to determine the most profitable.

7 Claims, 6 Drawing Sheets

OPTIMIZING ENERGY USE IN A DATA CENTER BY WORKLOAD SCHEDULING AND MANAGEMENT

CROSS-REFERENCED TO RELATED APPLICATIONS

This application is a continuation of co-pending U.S. patent application Ser. No. 12/987,413, filed Date Jul. 7, 2011. The aforementioned related patent application is herein incorporated by reference in its entirety.

BACKGROUND

The present invention generally relates to energy management in a data center, and more particularly, to executing tasks in a manner to lower the operating costs of the data center.

DESCRIPTION OF THE RELATED ART

A substantial percentage of existing data centers will have insufficient power and cooling capacity in the near future. Even if this increasing need is met, power is the second-highest operating cost (after labor) in the majority of all data centers. Compounding the problem is that data centers use workload managers that fail to account for the operating costs of the data center when scheduling workloads. Typical workload managers consider only performance criteria when assigning computing resources to carryout a task. However, in many situations, the data center may perform a task within a time constraint while simultaneously reducing operating costs.

A data center typically houses numerous printed circuit (PC) board electronic systems arranged in a number of racks. A standard rack may be configured to house a number of PC boards, e.g., about forty boards. The PC boards typically include a number of components, e.g., processors, microcontrollers, high-speed video cards, memories, semiconductor devices, and the like, that emanate relatively significant amounts of heat during operation. For example, a typical PC board comprising multiple microprocessors may use approximately 250 W of power. Thus, a rack containing forty PC boards of this type may consume approximately 10 kW of power and generate substantial amounts of heat.

The power required to dissipate the heat emanated by the components in the racks is generally equal to about 10 percent of the power needed to operate the components. However, the power required to dissipate the heat emanated by a plurality of racks in a data center is equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling fluid—e.g., air—across the heat emanating components; whereas, data centers often implement reverse power cycles to cool heated return air. In addition, various cooling mechanisms have different cooling efficiencies. For example, water-cooling units operate more efficiently than air-cooling units, but are costlier to install. The additional work required to achieve the temperature reduction, in addition to the work associated with moving the cooling fluid in the data center and the condenser, often add up to the 50 percent power consumed by the data center. As such, a workload manager that accounts for these energy costs may lower the operating costs of a data center without sacrificing performance.

SUMMARY

Embodiments of the invention provide a method, system and computer program product for creating and selecting a cost-saving method for scheduling tasks submitted to a data center. The method, system and computer program product include receiving a task to be performed by computing resources within the data center. Also, the method, system and computer program product include determining a cost-saving method for scheduling the task based on a job completion constraint and a data center operating cost constraint, wherein the job completion constraint defines one of (i) an operating parameter of the data center when executing the task and (ii) a penalty associated with executing the task. Finally, the method, system and computer program product include scheduling the task using the cost-saving method.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
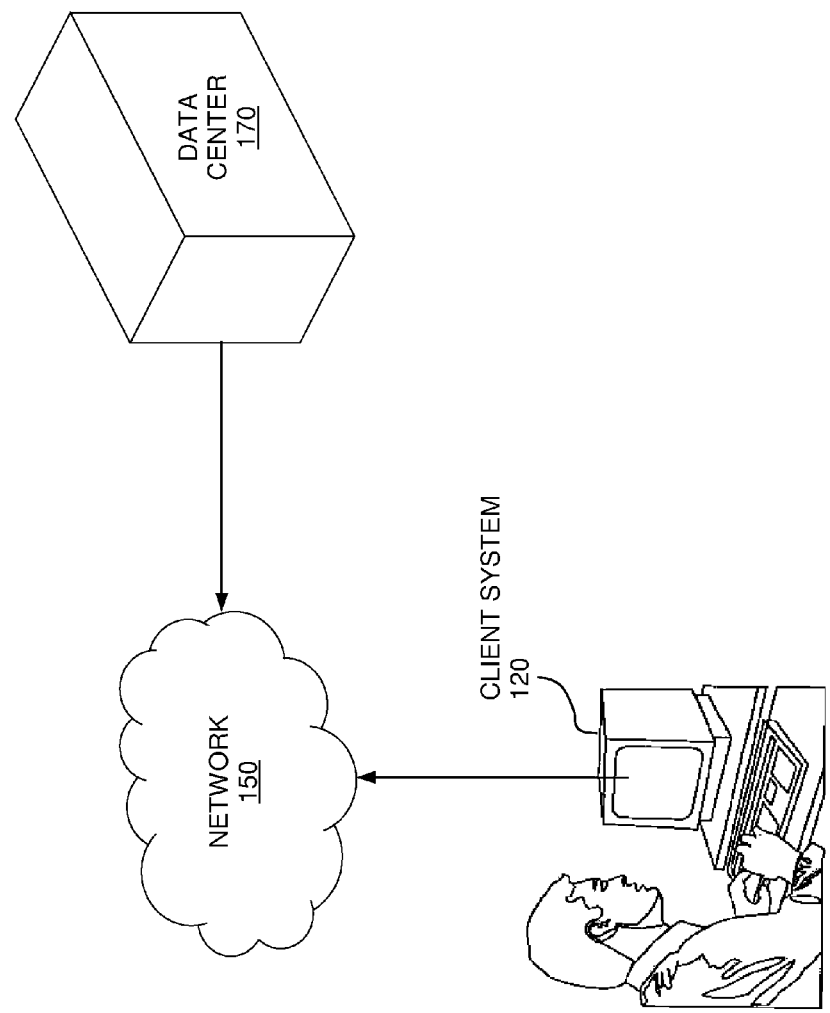
FIG. 1A-1B are block diagrams illustrating a networked system for scheduling tasks in a data center, according to embodiments of the invention.

Many data centers use workload managers to execute tasks on computing resources located within the data center. The scheduling criteria used by the workload manager, however, is typically limited to performance standards—i.e., the time and computing resources needed to complete a job. Under this scheme, the workload manager assigns the task in the most time efficient manner even if the results are not needed immediately. This myopic approach fails to consider the operating costs incurred when completing jobs. In many situations, operating costs may be reduced while performance standards are still met. A workload manager that schedules task by balancing cost with performance may decrease the environmental impact of data centers and increase profitability.

In one embodiment of the invention, a workload manager considers both performance standards and operating costs when scheduling jobs in a data center. In general, the workload manager receives a task (or job) to be performed by computing resources found within the data center and determines how much time is required to complete the task. The workload manager may then compare the required time to a job completion constraint. This requirement establishes the operating parameters of the data center when performing the task—i.e., how much time is allotted for a particular task to run, memory that may be used, or amount of computing resources allotted. If a given task can be executed within the allotted time, then the workload manager schedules the job in a manner to reduce operating costs so long as the task still executes within the allotted time. As such, the workload manager balances the performance standards (e.g., the job completion constraint) with the operating costs of the data center.

In another embodiment, the workload manager receives a task to complete but determines that scheduling the task in a manner to lower operating costs violates the job completion constraints—e.g., the data center is performing at near maximum capacity. Nonetheless, the workload manager may still schedule the job to reduce operating costs. For example, a violation of the job completion constraints (i.e., failing to complete a job within a specified time) might contractually require the owner of the data center to pay a penalty. But the savings from lowering the operating costs might be greater than the penalty. Thus, the workload manager may select the more profitable choice and schedule the task in a manner to lower the operating cost.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., workload managers) or related data available in the cloud. For example, the workload manager could execute on a computing system in the cloud and schedule task for data centers also located within the cloud. In such a case, the workload manager could receive task to be completed by computing resources in a data center and store the results at a data center in the cloud. Doing so allows a user to access this information from any computing system attached to a network connected to the cloud (e.g., the Internet).

Figure 1B:
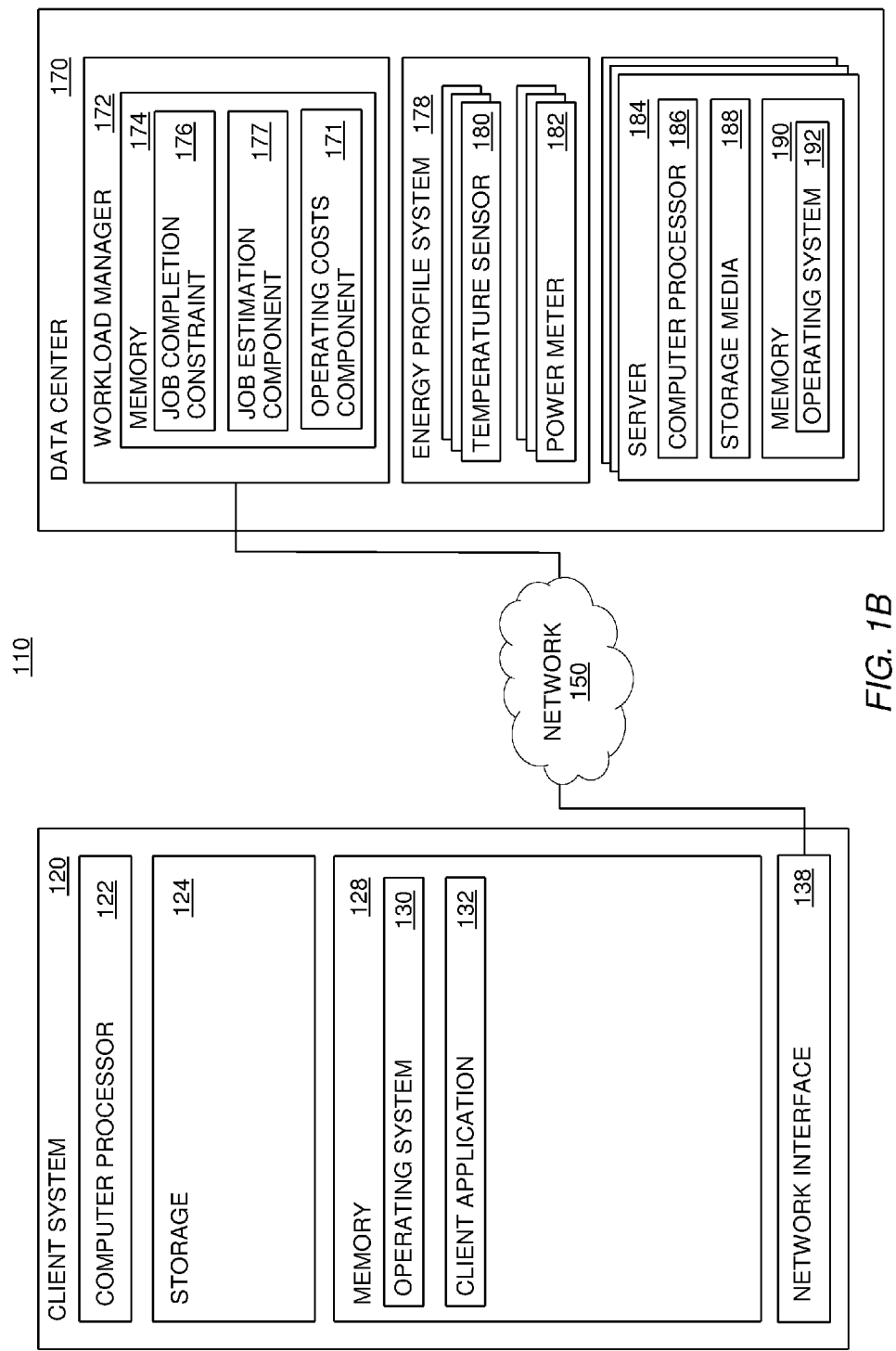

FIG. 1A-1B are block diagrams illustrating a networked system for scheduling tasks in a data center, according to embodiments of the invention. As shown, FIG. 1A is a block diagram illustrating a networked system for scheduling tasks received from a client system, according to embodiments of the invention. In the depicted embodiment, the system 100 includes a client system 120 and a data center 170 connected by a network 150. Generally, the client system 120 may submit requests (i.e., tasks) over the network 150 to a workload manager running on the data center 170. The term "task" denominates a set of commands for instructing the computing resources found within the data center to store, process, or access data. Tasks may take the form of a command language, such as the Structured Query Language (SQL), that lets programmers and programs select, insert, update, find out the location of data, and so forth. Generally speaking, any requesting entity can issue tasks to be performed by computing resources in a data center 170. For example, software applications (such as by an application running on the client system 120), operating systems, and, at the highest level, users may submit tasks to the data center 170. These tasks may be predefined (i.e., hard coded as part of an application) or may be generated in response to input (e.g., user input). Upon receiving the task, the workload manager on the data center 170 assigns the task to specific computing resources according to certain criteria and then returns the result of the executed task if required.

The requesting entity is generally oblivious to method used by the data center 170 to perform the task. Once a task is submitted to a data center 170, the workload manager is usually free to assign the task to any computing resources it desires. For example, the task may be completed by one or more different computing processors or divided up into multiple sub-tasks. However, the requesting entity may be concerned with the amount of time taken to execute a task. As an example, the user of a client system 120 may require that the data center 170 complete the tasks submitted by the user within five seconds. In such a case, the client system 120 establishes a job completion constraint that governs how the workload manager schedules tasks. A "job completion constraint" is any requirement (e.g., a time or redundancy requirement) that establishes operating parameters for the workload manager when scheduling tasks. These requirements may be defined by contract, such as a service level agreement (SLA), or set by an administrator based on IT resource constraints. As an example, certain computing resources may be reserved for only certain tasks. The workload manager evaluates any job completion constraints and schedules a received task accordingly.

FIG. 1B is a block diagram of a networked computer system for scheduling tasks received from a client system, according to embodiments of the invention. As shown, the system 110 contains a client system 120 and a data center 170. The client system 120 contains a computer processor 122, storage media 124, memory 128 and a network interface 138. Computer processor 122 may be any processor capable of performing the functions described herein. The client system 120 connects to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating tasks to be executed by a data center 170. Once the client application 132 generates a task, the job may be submitted to a server (e.g., server 184) for execution. The operating system 130 may be any operating system capable of performing the functions described herein.

The data center 170 contains a workload manager 172, energy profile system 178, and servers 184. The workload manager 172 contains memory 174 which stores the job completion constraints 176, the job estimation component 177, and the operating costs component 171. The job completion constraints 176 store the operating parameters for completing a received task—e.g., a time constraint, memory that may be used, or amount of computing resources allotted. The job estimation component 177 evaluates each incoming task to determine the time needed to perform a task based on available computing resources (e.g., servers, virtual machines, or databases). The operating costs component 171 gathers information concerning variables that may influence operating costs—e.g., energy consumed, outside temperature, variable energy costs, or system workload—and determines various ways to schedule tasks to lower these costs. These different variables will be discussed in greater detail below.

The energy profile system 178 includes temperature sensors 180 and power meters 182. Multiple temperature sensors 180 may be placed around the data center 170. Each temperature sensor 180 can either send information directly to the operating cost component 171 or the aggregate information is used to create a temperature density. Although FIG. 1B depicts the temperature sensors 180 as being inside the data center 170, temperatures sensors 180 may be located outside the building or in adjacent rooms to measure the ambient temperature. Power meters 182 are used to record the power consumed by different components. For example, each computer room air conditioning (CRAG), coolant distribution unit (CDU), or computer hardware component (e.g., a server) may have an individual power meter 182. Like the temperature sensors 180, the power meters 182 send the information concerning energy consumption to the operating costs component 171.

In one embodiment, the servers 184 are the computing resources of the data center 170; however, the computing resources may be structured in a variety of ways, such as virtual machines, abstract databases, distributed computing environments, and the like. The servers 184 contain a computer processor 186, storage media 188, memory 190 and an operating system 192. Computer processor 186 may be any processor capable of performing the functions described herein. Although memory 178 is shown as a single entity, memory 178 may include one or more memory devices having blocks of memory associated with physical addresses, such as random access memory (RAM), read only memory (ROM), flash memory or other types of volatile and/or nonvolatile memory. The operating system 180 may be any operating system capable of performing the functions described herein. Furthermore, as will be understood by one of ordinary skill in the art, any computer system capable of performing the functions described herein may be used.

Generally, the client application 132 generates and submits tasks to the workload manager 172 using the network 150. A workload manager 172 may be created using job specification design language (JSDL), such as IBM®'s Tivoli® Dynamic Workload Broker, to control the job scheduling in a data center 170 using a virtualized environment. According to embodiments of the invention, once the workload manager 172 receives a task, the job estimation component 177 calculates an estimated time required to perform for the task. Such a calculation may be based on values in the received task. For example, if the task is to query a database, the job estimation component 177 may determine that a SELECT statement from a particular table in the database requires one second to complete. Additionally, the calculation may be based on historical data (not shown) derived from executing similar tasks. For example, the historical data may contain data indicating that the workload manager 172 has previously scheduled a similar (or identical) job to the received job. In such a case, the job estimation component 177 may calculate the estimated time for execution of the received task based on the time needed for the previously processed task. Furthermore, the job estimation component 177 may estimate the required time based on the system conditions. If the server 184 is already processing received tasks, then a new task may take longer than if the servers 184 were idle. Of course, the above examples are merely for illustrative purposes, and one of ordinary skill in the art will recognize that other data may be used to estimate the time needed to complete a task.

Figure 2:
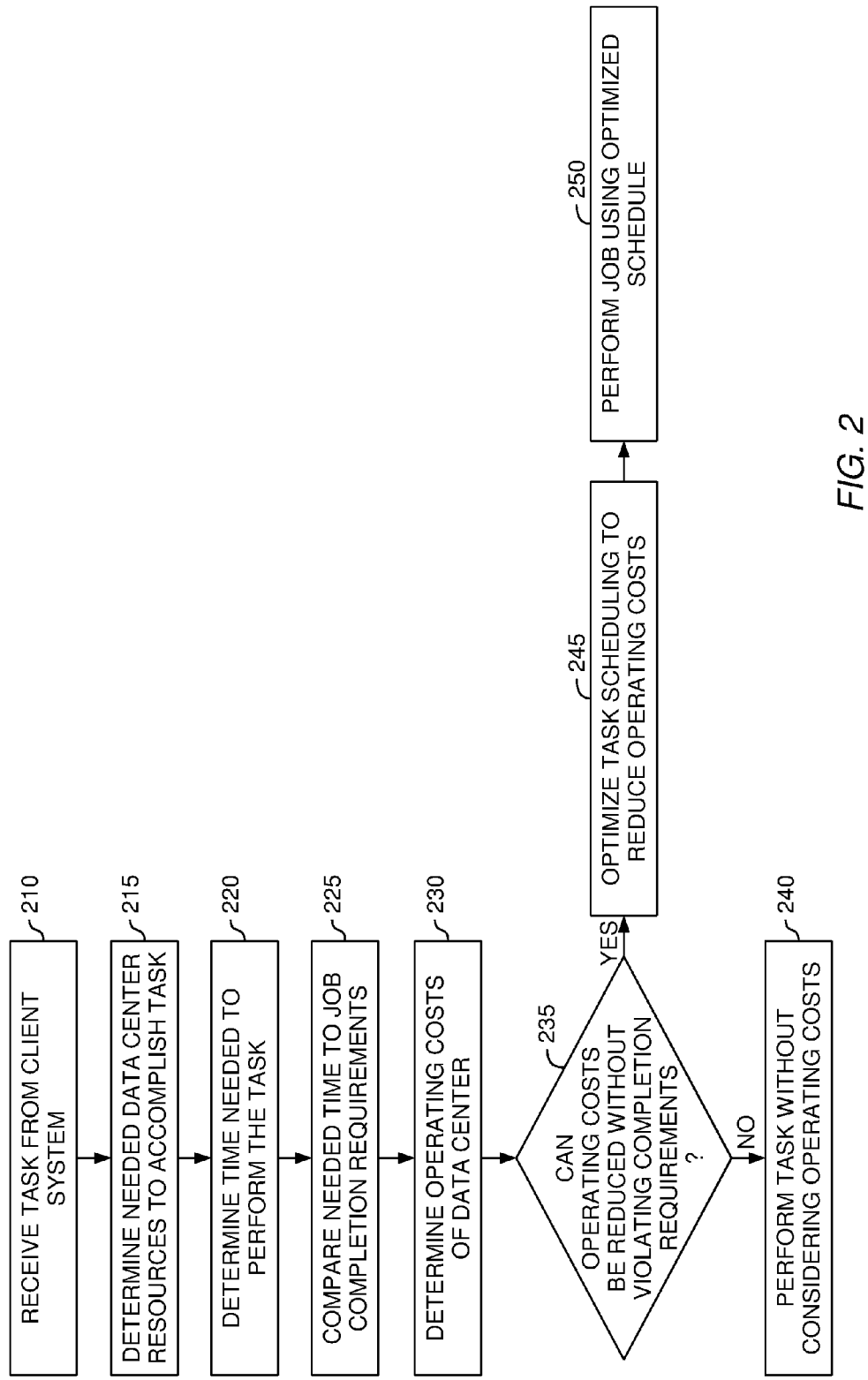
FIG. 2 is a flow diagram illustrating methods of scheduling tasks within a data center, according to embodiments of the invention.

FIG. 2 is a flowchart that illustrates a process of managing the workload for a data center, according to one embodiment. At step 210, the workload manager 172 receives a task from the client system 120. This task may originate from a user, an application, another data center, or from a sub-system within the data center 170. At step 215, the workload manager 172 determines the amount of data center resources needed to accomplish the task. In one embodiment, the data center 170 is a normalized virtual IT execution container (e.g., a unit virtual machine (VM) with a CPU, memory, and I/O capacities) with certain IT constraints. The workload manager 172 identifies the number of data center units (e.g., virtual machines) used to complete the task and the amount of time taken. This yields a rate at which a particular task is executed—i.e., the number of virtual machines needed per hour (VM/hr). At step 220, the job estimation component 177 uses this historical rate to estimate a time of execution for a similar, received task. For example, if five virtual machines are available, and the estimated historical rate for the task is 25 VM/hr, then the estimated execution time for that task is five hours. In general, the job estimation component 177 may estimate the time of completion based on general information about a task, the current system workload, or historical data. This embodiment is independent of any particular method of estimating the completion of a task or process. Thus, one of ordinary skill in the art will recognize that any method of estimating the time to complete a task that meets the requirements described herein may be used.

At step 225, the estimated time is compared to the job completion constraints 176. In general, the workload manager 172 ensures that the task can be completed within the operating parameters contained in the job completion constraints 176. In one embodiment, the job completion constraints 176 are defined by a contractual agreement such as a service level agreement (SLA). A SLA is a part of a service contract where the level of service is formally defined. In practice, the term SLA may refer to the contracted delivery time (of the service) or performance. As an example, the user of a client system 120 enters into a SLA with the owner of a data center 170. Within the terms of the contract, it defines the level(s) of service demanded, e.g., various data rates, serviceability, performance, operation, or other attributes of the service. Specifically, the SLA may state that for a given type of task, the data center must return a result within five seconds. For larger tasks, such as computing the monthly payroll, the SLA may require the results be returned the next business day. Typically, the user pays the data center a fee in return for the use of the data center 170. Accordingly, the SLA may establish penalties if the data center does not meet the contractual obligations. As an example, if the payroll is delivered late, then the owner of the data center pays a $1000 penalty. The terms of the SLA may be stored in the job completion constraints 176 and compared to the estimated time of executing a task.

In another embodiment, an administrator sets the job completion constraints 176 by specifying a list of tasks and a maximum amount of time allotted to execute each task. For example, a task that stores personal employee information should be completed within seconds, but a task that processes models associated with a weather pattern may be allotted several hours. The administrator may also limit the memory used, number of virtual machines allotted, and other similar IT resource constraints to establish the operating parameters. These constraints may be dealt with in a similar manner as time constraints to reduce operating costs. Moreover, the job completion constraints 176 may group multiple tasks together by assigning a single time constraint—e.g., the payroll for every department must be finished within twenty-four hours. Furthermore, the administrator may prioritize tasks such that greater time constraints are placed on more important tasks. In general, the shorter time allotted for a task, the more computing resources needed to accomplish that task (i.e., requiring the use of multiple virtual machines, parallel processing, or distributed computing). One of ordinary skill in the art will recognize the various ways of scheduling a task using different types and implementations of computing resources.

In one embodiment, the job completion constraints 176 may include a redundancy or back-up plan established by an administrator or a SLA. Such a plan may require that a portion of the stored data in a data center 170 be backed up at regular intervals. This task, however, is typically set without consideration of incurred operating costs. This may lead to waste since delaying a system back-up to a time when operating costs are lower may increase the profitability of the data center 170. Similarly, there may be an associated penalty for failing to follow redundancy protocol stored in the job completion constraints 176. Under a SLA, the penalty may be a set rate, but it may also be the cost of recovering the data if a system crash occurs—i.e., proportional to the amount of data lost.

At step 230, the workload manager 172 determines the operating costs of the data center 170. The operating costs component 171 may keep track of the operating costs continuously or update the costs when the workload manager 172 receives a new task. The operating costs component 171 receives information from the energy profile system 178 via the temperature sensors 180 and power meters 182. This information may be extrapolated to build an operating cost profile for the data center which is then used to determine different methods of lowering operating costs. Moreover, the operating costs component 171 may use the rate of execution of a task (i.e., virtual machines per hour) to determine energy consumed while performing the task. As an example, each unit rate (i.e., 1 VM/hr) may require 5 kW of power during a certain period of the day; thus, a task with an estimated rate of 25 VM/hr will use 125 kW of power. The operating costs component 171 can use this information to determine which tasks will consume the most energy, and thus, should be scheduled using more aggressive cost saving methods. Before discussing techniques of lower operating costs, however, the different variables that may affect such costs must be introduced.

Figure 4:
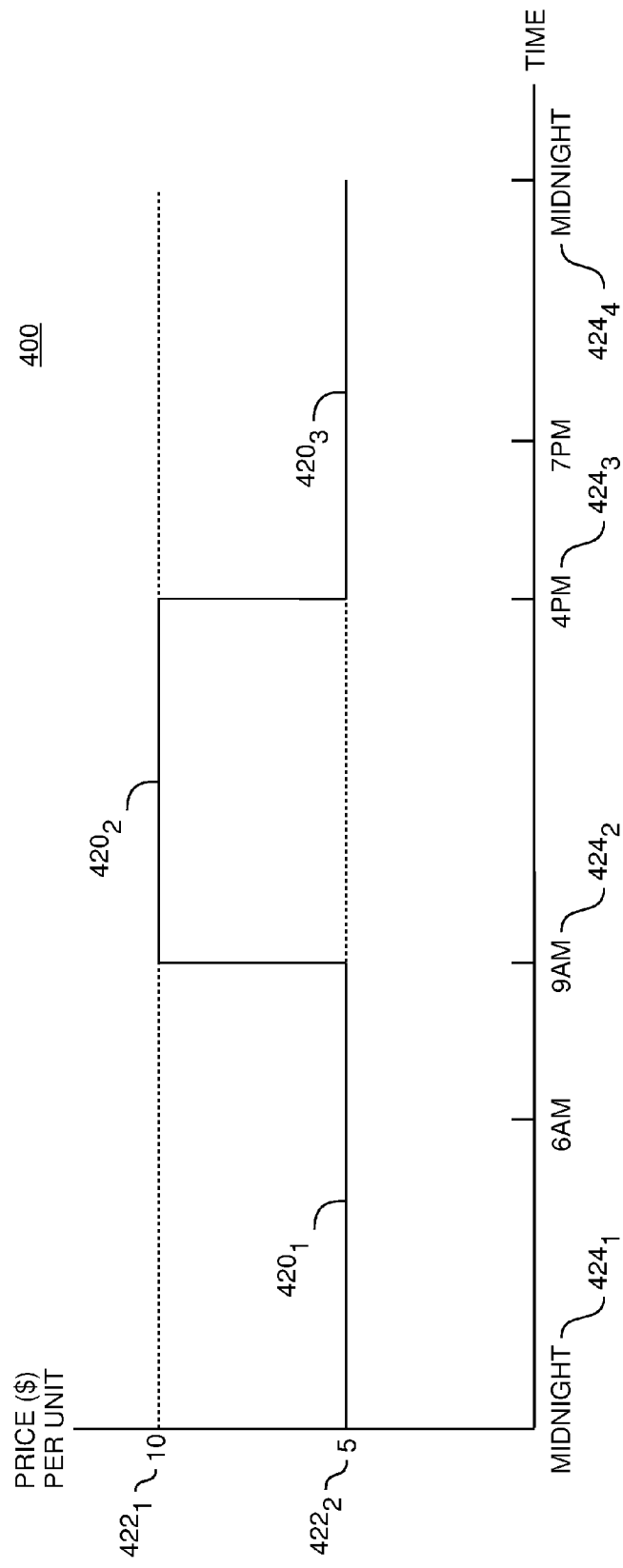
FIG. 4 is a graph illustrating a variable energy rate, according to embodiments of the invention.

FIG. 4 is a graph which illustrates an exemplary power pricing structure, according to one embodiment of the invention. In the depicted example, the graph 400 represents a power pricing schedule for a typical power plant. As shown, the graph 400 includes three pricing levels 420$_{1-3}$. Each pricing level 420 corresponds to a price 422 per unit of power and a time range. The time range may be specified by two time values 424. For example, the time range may include a start time value 424 and an end time value 424. As an example, pricing level 420$_1$ corresponds to a price 422$_2$ of $5.00 per unit of power, and a time range beginning at start time midnight 424$_1$ and end time 9:00 am 424$_2$. As a second example, pricing level 420$_2$ corresponds to a price 422$_1$ of $10.00 per unit of power, and a time range beginning at start time 9:00 am 424$_2$ and end time 4:00 pm 424$_3$. FIG. 4 shows an exemplary power price schedule where the price for power varies depending on the time of day. Typically, demand for power is less during the nighttime than during the daytime. FIG. 4 also illustrates the fact that when demand is typically the lowest—from 4:00 pm 424$_3$ to 9:00 am 424$_2$—so is the price. As shown, a power company charges a premium for power usage during peak hours, but charges a reduced rate for power usage during off-peak hours. Thus, the time of day that a task is executed affects operating costs.

Ambient temperature may also affect operating costs. In one embodiment, the operating cost component 171 receives measurements from a temperature sensor 180 located outdoors—perhaps near a vent that provides air to a CRAC. If the ambient temperature is high, then the CRAC must consume more energy to cool the air than if the ambient temperature was low. In general, certain periods of the night offer cooler temperatures than during the day. Thus, at night a CRAC may use less energy to cool outside air before circulating that air in the data center 170. Additionally, if a temperature sensor 180 detects an outside temperature at or below the desired temperature setting of the CRAC, then using the outside air costs only the energy needed to circulate it. Additionally, temperature sensors 180 may be placed in rooms adjacent to the data center 170. The energy profile system 178 reports these temperatures to the operating costs component 171 to account for heat that may be radiating from shared walls.

Hardware components (e.g., servers 184) affect both the temperature and the energy consumed in a data center 170. One of the cooling system's tasks is to cool the hardware components. Accordingly, the data center 170 must consume energy to power the servers 184 and to simultaneously cool them using a CRAC or CDU. A rack, which includes multiple servers 184, may contain forty PC boards and consume approximately 10 KW of power. Typically, the cooling units must consume 50 percent of the energy needed to operate the PC boards to cool the components on the rack, thus, a cooling unit would consume 5 KW to cool each rack. A data center 170 would then expend 15 KW of power per rack. Moreover, power consumed by hardware fluctuates based on the amount of processing occurring on the hardware. Accordingly, the heat radiated from hardware also increases as workload increases, thereby requiring the cooling units to consume additional energy to cool the components.

In one embodiment, the operating costs component 171 may record how much energy is consumed in units of VM/hr for a certain time of the day—e.g. 5 kW at 12:00 pm but only 3 kW at 12:00 am because of cooler outside air. This generalization combines all of the aforementioned factors affecting the operating costs of a data center 170 into a single number that corresponds to the time a workload manager 172 receives and schedules a task. For example, if a task is received at 12:00 pm and executes at a rate of 10 VM/hr, then the energy consumed will be 50 kW if the task is executed immediately but only 30 kW if the same task is executed at 12:00 am. Thus, the operating costs component 171 can quickly determine the cost of executing a task.

Now that variables affecting the operating costs of cooling units have been introduced, techniques or methods for lowering these costs may be discussed. Much like a job completion constraint, the various techniques for lowering operating costs may be considered as constraints by the workload manager 172.

In one embodiment, the workload manager 172 uses a scheduler to postpone or delay jobs. For example, at step 225, the job estimation component 177 determines whether the time needed to execute the job is less than the allotted time recorded in the job completion constraints 176. If so, the workload manager 172 may delay the job to a time when energy costs are cheaper. For example, the data center 170 may be powered by a wind farm, which generally produces more power at night when the most wind occurs. Accordingly, the data center 170 has access to cheaper power at night. Referring again to FIG. 4, this graph illustrates such a variable energy-pricing structure. If a workload manager 172 receives a job at 3:50 pm, if possible, the task should be scheduled to run after 4:00 pm 424$_3$ when power is available at a cheaper rate. The operating costs component 171 may store any information pertaining to variable energy costs.

In another embodiment, the data center 170 uses cogeneration power. Cogeneration uses waste heat produced from generating electricity to either heat nearby buildings or run absorption chillers for cooling. An absorption chiller uses waste heat instead of mechanical cooling to operate the chiller. Accordingly, a data center 170 may have access to absorption chillers that can replace or assist the CRACs or CDUs to cool the servers 184. Because these chillers operate off heat produced from generating electricity, their peak cooling may be correlated with the peak hours of electricity use. The workload manager 172 may use this correlation as a constraint when scheduling a task. Therefore, a data center 170 that uses absorption chillers may schedule tasks to run at peak hours of energy usage to benefit from the cheap cooling provided by the absorption chillers.

In another embodiment, the workload manager 172 may schedule a task to run during nighttime to advantageously use the cooler air. For example, a CRAC may pull air from the outside rather than continually recycling air from within the data center 170. In either case, the CRAC may have to cool the air before distributing it throughout the data center 170. However, the outside nighttime air may be cooler than the recirculated air, and therefore, require less cooling (or perhaps no cooling at all). Scheduling a task to run when the outside air temperature is cooler than the recirculated air may allow the CRAC to consume less energy.

Recording the temperature found in adjacent rooms provides the workload manager 172 with another constraint to consider when reducing operating costs. For example, assume that an adjacent room contains manufacturing equipment which emits heat only during normal business hours. Some of this heat may radiate through shared walls with the data center 170 which forces the cooling units to consume more energy. The operating cost component 171 may record this temperature and inform the workload manager 172 to schedule tasks when the manufacturing equipment is no longer running. This prevents the cooling units from having to counter the heat emanating from the hardware components as well as the ambient heat radiating through the walls.

In one embodiment, instead of postponing the tasks, the workload manager 172 may power down certain servers 184 or migrate work between hardware components. Concerning the former, the workload manager 172 may disable certain servers 184 as an alternative to scheduling a task to run later. Because some servers 184 are powered off or are unavailable, tasks may begin to form a queue waiting for the limited computing resources to finish executing preceding tasks. The job estimation component 177 determines how much a task is delayed by powering down different percentages of the computing resources. In this manner, the workload manager 172 may force the task into a queue to be performed when energy prices are reduced or when a CRAC can advantageously use cooler outside air. Concerning the latter, the workload manager 172 may also migrate workloads to different servers 184. For example, a certain task may take all night if the workload manager 172 schedules the job to run on only one server. Nonetheless, the server 184 may be cooled by a CDU which is much more efficient than a CRAC. Though the task requires more time to execute, the cost of cooling the hardware component that performs the task (i.e., the operating cost) is greatly reduced. In one embodiment, the operating costs component 171 may store the information that details the types of cooling units that cool each server in the operating costs component 171.

Regarding redundancy or back-up plans, the workload manager 170 may consider possible power outages as operating costs constraints. For example, during a power outage (or blackout) the data center 170 is unable to operate. Similarly, the power meters 182 may detect a brownout (i.e., a voltage sag) which can trigger the workload manager 172 to reschedule tasks to alleviate stress on the power system and avoid a blackout (i.e., a total loss of power). This would lower the operating costs since the data center 170 would still be able to operate albeit under certain limitations. In another example, the workload manager 172 may consider rolling blackouts when scheduling a task. The workload manager 172 may aggressively schedule jobs before the blackout knowing that the added heat will dissipate during the blackout. Also, the workload manager 172 may prioritize tasks so that more important tasks are completed before the blackout (and avoid any associated penalties).

The workload manager 172 and operating costs component 171 may use all the aforementioned embodiments (or combinations thereof) to lower operating costs of the data center 170. However, one of ordinary skill in the art will recognize that any method of lowering operating costs through the use of a workload manager 172 as described herein may be used.

Returning to FIG. 2, at step 235 the workload manager 172 evaluates each possible technique of lowering operating costs developed by the operating costs component 171 to determine which may violate the job completion constraints 176. For example, the computing resources may be able to complete the job in five seconds and the job completion constraints 176 may allot ten seconds to the job. However, one method of lowering the operating costs (e.g., performing the task only on a server cooled by a CDU) may cause the execution time to increase to fifteen seconds. Thus, in this embodiment the workload manager 172 would not choose that method. Nonetheless, the operating costs component 171 may provide an alternative method, such as scheduling half of the task to be completed by the server 184 cooled by the CDU, which may keep the execution time within the time constraint described in the job completion constraints 177. Or the proposed method may be a combination of two different types of techniques that lower operating costs (e.g., migrating a task to a certain server 184 and postponing the job until variable energy prices fall). However, if the operating costs component 171 cannot provide a method or variation thereof that reduces operating costs and still satisfies the job completion constraint 176, then at step 240 the workload manager 172 assigns the task based upon the performance standards found within the job completion constraints 176. For example, in this embodiment, if the job completion constraint 176 requires the data center 170 to complete the task under two seconds and all of the proposed techniques of reducing operating costs (or combinations thereof) would complete the task in over two seconds, then the task is scheduled based only on the job completion constraints 176. Accordingly, the different techniques of reducing the operating costs also introduce a constraint that may be considered by the workload manager 172.

The operating costs component 171 may also use the rate of execution (VM/hr) to prioritize the suggested methods of lowering operating costs. As an example, the rate for a first received task is 20 VM/hr but the rate for a second task is only 10 VM/hr. In general, the higher the rate, the more energy required to complete the task. The more cost-effective approach may be to aggressively lower the cost of performing the first task (e.g., postpone it for several hours until energy costs are less expensive). The operating costs component 171 then submits the proposed method. Before the method is implemented, however, the workload manager 172 ensures that any method of reducing cost still permits the task to be completed with the operation parameters established in the job completion constraints 176.

At step 245, the workload manager 172 has determined that a possible method provided by the operating costs component 171 lowers operating costs while simultaneously meeting established performance standards. Thus, the workload manager 172 uses the chosen cost-saving method (or combination of methods) when optimizing a workload plan for executing the task. At step 250, the workload manager 172 implements the workload plan to execute the task. One of ordinary skill in the art will recognize that any process that creates and implements a workload plan as discussed herein may be used.

In one embodiment, the workload manager 172 may reevaluate previously scheduled tasks. For example, the workload manager 172 may have scheduled a task to run several hours later during the nighttime. However, a cold front may have recently caused the ambient temperature to fall. A temperature sensor 180 within the energy profile system 178 may record this decrease in ambient temperature and alert the workload manager 172. Accordingly, a CRAC that pulls air from the outside now needs less energy to cool the air before distributing it throughout the data center 170. Running the postponed task following the cold front may lower operating costs more so than running the task at night. Thus, the workload manager 172 may dynamically adjust a workload plan already established for a particular task.

Figure 3:
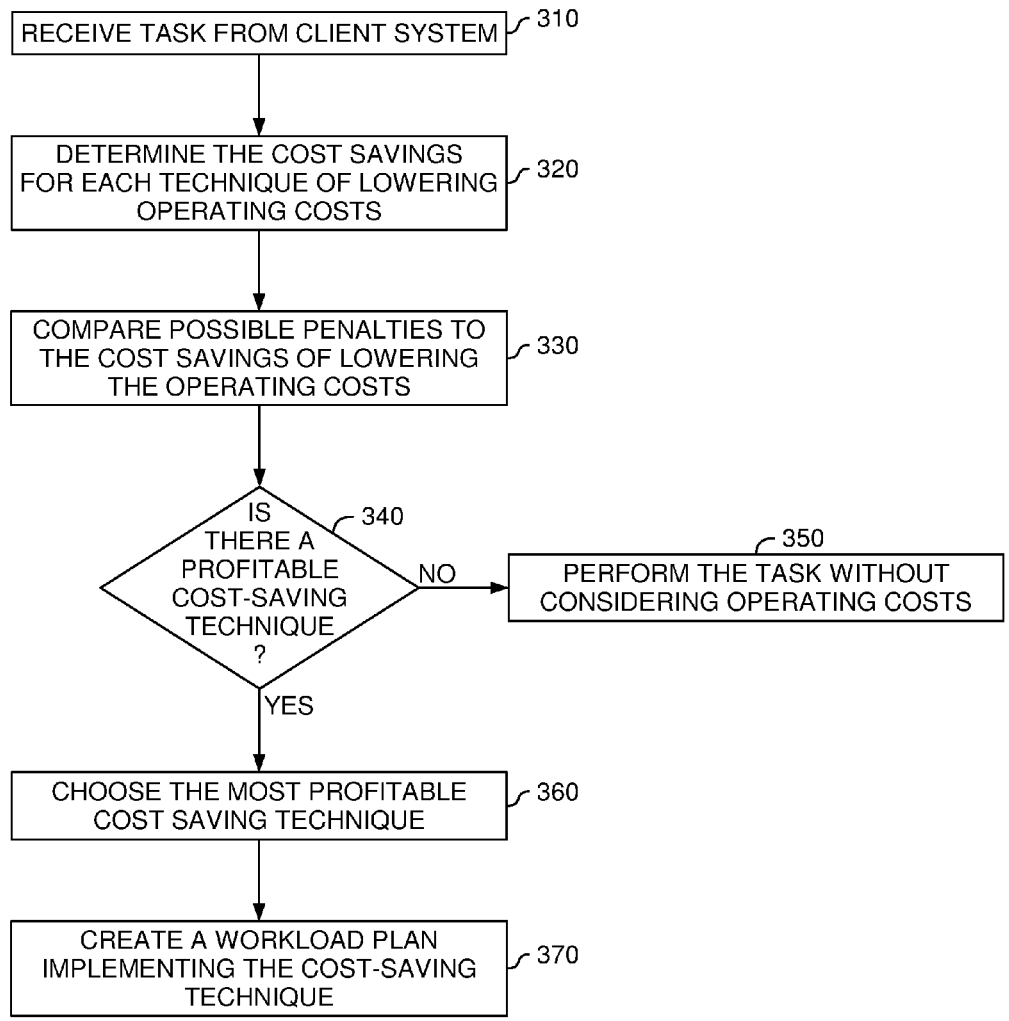
FIG. 3 is a flow diagram illustrating methods of scheduling tasks within a data center, according to embodiments of the invention.

FIG. 3 is a flowchart that illustrates a process of managing the workload for a data center, according to one embodiment. At step 310, the workload manager 172 receives a task for a client system 120. At step 320, the operating costs component 171 estimates the cost savings for every technique that lowers the operating costs (e.g., postponing, transferring, or migrating the task). For example, if immediately executing the task consumes $200 worth of power but costs only $150 if executed after 9:00 pm because of variable energy costs, then the cost savings for that technique is $50. The operating costs component 171 may do a similar calculation for all the different techniques and combinations thereof.

In this embodiment, the job completion constraints 176 may be established by a contractual agreement—e.g., a SLA—which includes penalties for violating the terms. These penalties may be fixed per violation or, if the penalty is based on time, increase according to the length of the delay. At step 330, the workload manager 172 compares the cost savings of each technique proposed by the operating costs component 171 to the penalties incurred under the contractual agreement. This comparison determines the profitability of a workload plan that uses the cost-saving technique. Unlike in FIG. 2, this embodiment does not explicitly consider whether a particular technique will violate the job completion constraints 176. Instead, at step 340, the workload manager 172 determines whether each cost-savings technique is profitable. A technique that violates the operating parameters may (or may not) be the most profitable. For example, a SLA may require a response time for two seconds to complete a task and establish a $1000 penalty for each month this requirement is violated. The operating costs component 171, however, may inform the workload manager 172 that increasing the response time to four seconds will save 30% of the 1500 kW used monthly and yield a savings of $2250 (at a rate of $5 per kW) and a profit of $1250. At step 360, the workload manager 171 performs this profitability calculation for each technique to discover the one that yields the most profit. Continuing the previous example, assume that another cost-saving technique saves only 20% of the 1500 kW used monthly but does not incur a penalty (e.g., the tasks are forced to run on a idle server cooled by a CDU). In such a case, both the savings and profit is $1500. Thus, the workload manager 172 would choose this technique because it maximizes profit even though the technique does not offer the greatest savings.

So long as one cost-saving technique generates a profit, at steps 360 and 370, the workload manager determines the most profitable technique and creates a workload plan that implements the technique. Otherwise, at step 360, the workload manager 172 formulates a workload plan that ignores the operating costs of the data center 170.

In another embodiment, the workload manager 172 may determine that a received task cannot be completed within the time allotted in the job completion constraints 176 irrespective of scheduling the job in a manner to reduce operating costs. Nonetheless, the workload manager may still schedule the job to reduce operating costs. For example, if a contractual agreement establishes a flat fee for violating the job completion constraints 176, then the cost-saving technique that provides the most savings also yields the most profit since the job completion constraints will be violated regardless of the technique used. Conversely, if the contractual agreement establishes a penalty that increases as the delay in completing the task increases, then the workload manager 172 may continue to consider the performance standards when evaluating any potential cost-saving techniques.

Figure 5:
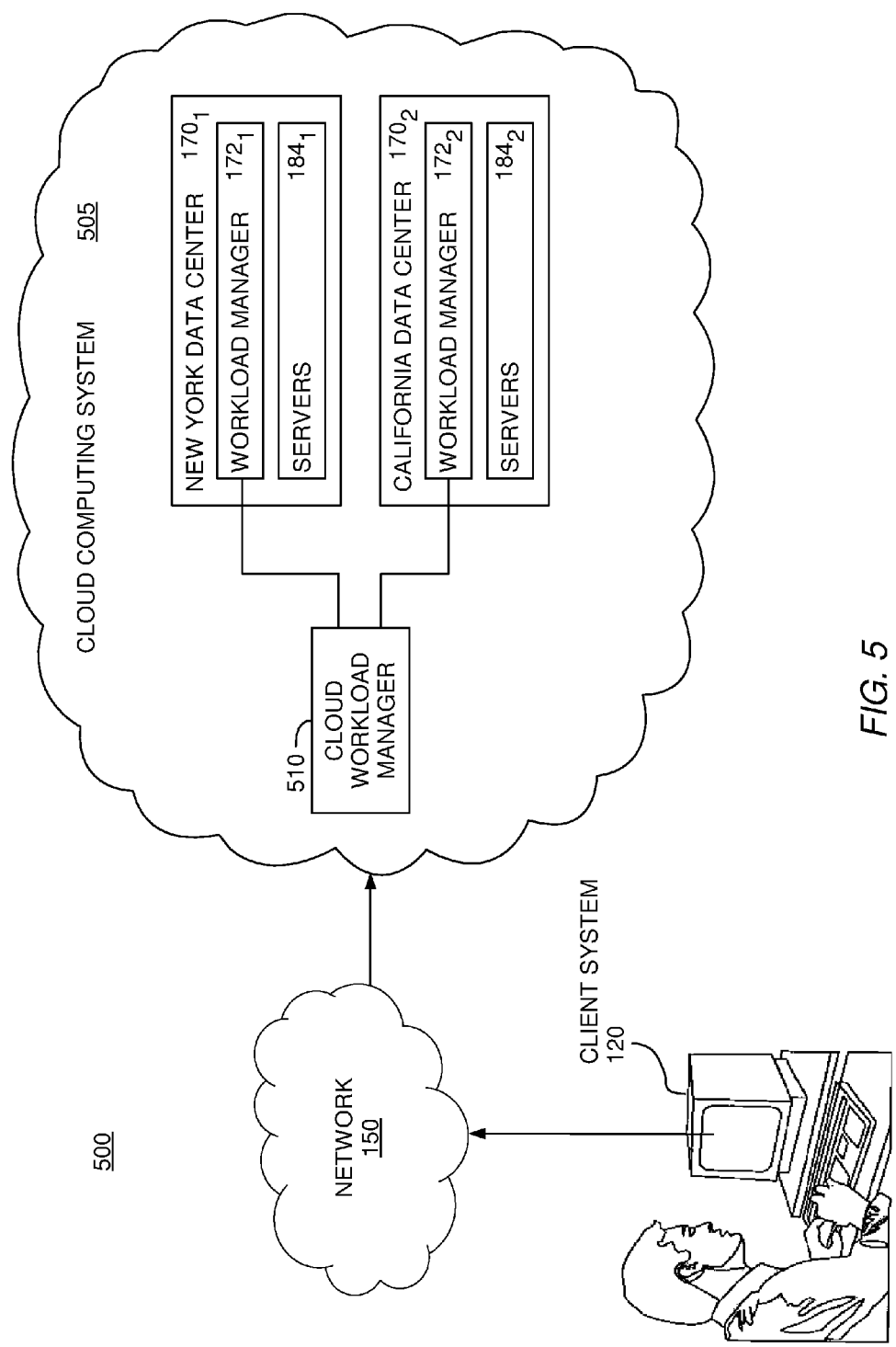
FIG. 5 is a block diagram illustrating a cloud computing system for scheduling tasks in a data center, according to embodiments of the invention.

FIG. 5 is a diagram illustrating an exemplary cloud computing system using a workload manager, according to one embodiment. The system 500 includes a client system 120, network 150, and a cloud computing system 505. The client system 120 and network 150 were discussed above in the discussion accompanying FIG. 1. The cloud computing system includes two data centers $170_{1-2}$ with corresponding workload managers $172_{1-2}$ and computing resources (i.e., servers $184_{1-2}$). The data centers 170 receive tasks via a cloud workload manager 510.

The cloud computing system 505 provides resources, software, and information to the client system on demand. In one embodiment, the network 150 is the internet which enables the client system to access the resources located in the cloud. The cloud workload manager 510 receives a task from the client system 120. As such, the cloud workload manager has two separate data centers capable of performing the task—the New York data center $170_1$ and the California Data Center $170_2$. The cloud workload manager 510 operates similarly to the workload managers $172_{1-2}$ located on the individual data centers $170_{1-2}$. In one embodiment the cloud workload manager 510 determines which data center 170 provides the most profitable cost-saving technique to complete the task within the operation parameters as described in the discussion accompanying FIG. 3. As an example, assume that the client system 120 is located in California and submits a task to the cloud workload manager at 6:00 pm PST (Pacific Standard Time). In a cloud computing environment, the client system 120 is typically ignorant of how or where the task is performed. Accordingly, the cloud workload manager 510 may choose either data center $170_{1-2}$ to assign the task. In one embodiment, the cloud workload manager 510 decides which data center 170 to assign the task based on energy prices. Continuing the example, when the task is submitted at 6:00 pm PST, it is 9:00 pm EST (Eastern Standard Time) at the New York Data Center $170_1$ which may qualify the data center $170_1$ for cheaper energy rates. Although the California data center $170_2$ is geographically closer, the New York data center $170_1$ may offer a greater profit.

In another embodiment, the workload managers $172_{1-2}$ on each data center may transfer the task to a different data center 170. In such a case, the cloud workload manager 510 may not consider profitability when assigning jobs. Instead, the cloud workload manager 510 may rely on, for example, geographic proximity to a client system 120. Assuming the client system 120 is closest to the California data center 170$_2$, the cloud workload manager 510 assigns received tasks to that data center. However, the workload manager 172$_2$, when determining profitability, may consider the variable energy rates associated with the New York data center 170$_1$ and transfer the task to that data center instead of completing it. In other words, a centralized cloud workload manager 510 does not need to determine profitability but can delegate that role to the individual workload managers 172$_{1-2}$ found in various data centers 170$_{1-2}$.

A cloud computing environment may be used in other ways to maximize profitability. Instead of variable energy rates based on the time of day, different sources of power may be considered. As an example, a data center 170 may receive power from a hydroelectric generator, a wind farm, or from solar panels. When combined with multiple data centers 170 linked together in a cloud computing system 505, these data centers 170$_{1-2}$ may transfer received tasks according to the different sources of power. For example, assume that the California data center 170$_2$ is powered by solar panels which offer cheap energy during sunny days. Accordingly, the New York data center 170$_1$ might transfer as many tasks as possible to the California data center when the sun is shining at that location. Of course, sending too much work to the California data center 170$_2$ might be less profitable than executing the task at the New York data center 170$_1$ (e.g., the tasks cannot be performed without paying a penalty which offsets the savings). In such a case, the workload manager 172$_2$ may transfer the task back to the New York data center 170$_1$. One of ordinary skill in the art will recognize that multiple data centers may be connected in many different methods to take advantage of variable energy rates, sources of cheap power, weather, and the like to increase profitability when scheduling tasks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of managing tasks in a data center, comprising:
receiving a task to be performed by computing resources within the data center; determining, by operation of one or more computer processors, at least two cost-saving methods for scheduling the task based on a job completion constraint, wherein the job completion constraint defines one of (i) an operating parameter of the data center when executing the task and (ii) a penalty associated with executing the task;

estimating a required time to complete the task using the computing resources in the data center without the cost-saving methods;

comparing the time needed to complete the task to the job completion constraint; upon determining that the required time satisfies the job completion constraint, estimating a time needed to complete the task using the computing resources in the data center with the cost-saving methods;

identifying any penalty incurred by the cost-saving methods;

determining a profit of the cost-saving methods based on savings and any incurred penalty associated with the cost-saving methods;

determining the most profitable cost-saving method based on the profit of each cost-saving methods; and upon determining the estimated time needed for the cost-saving methods satisfies the job completion constraint, scheduling the task using the most profitable of the cost-saving methods, wherein the most profitable cost-saving method delays the execution of the task in order to reduce the energy consumed by the data center relative to executing the task without a delay.

2. A method of managing tasks in a data center comprising:
receiving a task to be performed by computing resources within the data center;

determining, by operation of one or more computer processors, at least two cost-saving methods for scheduling the task based on a job completion constraint, wherein the job completion constraint defines one of (i) an operating parameter of the data center when executing the task and (ii) a penalty associated with executing the task, wherein the cost-saving methods generate savings by reducing the operating expenses of the data center when executing the task;

estimating a required time to complete the task using the computing resources in the data center without the cost-saving methods;

comparing the time needed to complete the task to the job completion constraint;

upon determining that the required time satisfies the job completion constraint, estimating a time needed to complete the task using the computing resources in the data center with the cost-saving methods;

identifying any penalty incurred by the cost-saving methods;

upon determining that the plurality of cost-saving methods do not incur a penalty, determining a profit of each cost-saving method based on the savings from each cost-saving method;

upon determining that at least one of the cost-saving methods does incur a penalty, determining the profit of the cost-saving methods based on the savings and any incurred penalty associated with the cost-saving methods;

determining the most profitable cost-saving method based on the profit of each cost-saving method; and upon determining the estimated time needed for the cost-saving methods satisfies the job completion constraint, scheduling the task according to the most profitable cost-saving method, wherein the most profitable cost-saving method delays the execution of the task in order to reduce the energy consumed by the data center relative to executing the task without a delay.

3. The method of claim 1, wherein the job completion constraint is set by at least one of: a contractual agreement and preferences of an administrator.

4. The method of claim 1, wherein the data center is connected to a plurality of data centers within a cloud computing network.

5. The method of claim 4, further comprising transmitting the task to a different data center within the cloud computing network.

6. The method of claim 1, wherein the job completion constraint defines both (i) an operating parameter of the data center when executing the task and (ii) a penalty associated with executing the task.

7. The method of claim 1, wherein estimating the time needed to complete the task with the cost-saving methods comprises estimating a number of data center units per a unit of time required in order to complete the task.

* * * * *